US011309096B1

(12) United States Patent
Wang et al.

(10) Patent No.: US 11,309,096 B1
(45) Date of Patent: Apr. 19, 2022

(54) INJECTABLE SACRIFICIAL MATERIAL SYSTEMS AND METHODS TO CONTAIN MOLTEN CORIUM IN NUCLEAR ACCIDENTS

(71) Applicant: National Technology & Engineering Solutions of Sandia, LLC, Albuquerque, NM (US)

(72) Inventors: Yifeng Wang, Albuquerque, NM (US); David Louie, Albuquerque, NM (US); Rekha R. Rao, Albuquerque, NM (US); Jeremy A. Templeton, Castro Valley, CA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 175 days.

(21) Appl. No.: 16/521,887

(22) Filed: Jul. 25, 2019

Related U.S. Application Data

(60) Provisional application No. 62/703,132, filed on Jul. 25, 2018.

(51) Int. Cl.
| | |
|---|---|
| G21C 9/016 | (2006.01) |
| G21C 15/18 | (2006.01) |
| G21C 9/00 | (2006.01) |
| G21C 19/48 | (2006.01) |
| C09K 5/18 | (2006.01) |

(52) U.S. Cl.
CPC ............... G21C 9/016 (2013.01); G21C 9/00 (2013.01); G21C 15/18 (2013.01); G21C 19/48 (2013.01); C09K 5/18 (2013.01)

(58) Field of Classification Search
CPC .......... G21C 9/016; G21C 9/033; G21C 9/02; G21C 9/48; G21C 9/38; G21C 9/00; G21C 15/18; G21C 15/182; G21C 19/48; C07F 1/02; C07F 3/04; Y02E 30/00; Y02E 30/30
See application file for complete search history.

(56) References Cited

U.S. PATENT DOCUMENTS

| | | | | |
|---|---|---|---|---|
| 4,121,970 A | * | 10/1978 | Albrecht | G21C 9/016 376/280 |
| 5,211,906 A | * | 5/1993 | Hatamiya | G21C 15/18 376/293 |
| 6,658,077 B2 | | 12/2003 | Alsmeyer et al. | |
| 7,558,360 B1 | | 7/2009 | Gamble et al. | |
| 8,358,732 B2 | | 1/2013 | Sato et al. | |
| 2012/0051485 A1 | | 3/2012 | Goda et al. | |
| 2012/0300893 A1 | | 11/2012 | Kurita et al. | |
| 2013/0170599 A1 | * | 7/2013 | Muller | G21C 9/033 376/282 |
| 2014/0241483 A1 | | 8/2014 | Zheng et al. | |
| 2016/0155521 A1 | * | 6/2016 | Naito | C03C 3/145 376/220 |
| 2016/0247585 A1 | * | 8/2016 | Han | G21C 15/24 |
| 2017/0106220 A1 | * | 4/2017 | Loewen | A62C 37/44 |
| 2018/0322967 A1 | | 11/2018 | Malloy, III et al. | |
| 2019/0341156 A1 | * | 11/2019 | Memmott | G21C 15/18 |

* cited by examiner

*Primary Examiner* — Darlene M Ritchie
(74) *Attorney, Agent, or Firm* — Daniel J. Jenkins

(57) ABSTRACT

Systems and methods for injecting a carbonate-based sacrificial material into a nuclear reactor containment for containment of molten corium in severe nuclear reactor accidents are disclosed. Molten corium can be quickly cooled and solidified by the endothermic decomposition of the sacrificial material.

6 Claims, 3 Drawing Sheets

INJECTABLE SACRIFICIAL MATERIAL SYSTEMS AND METHODS TO CONTAIN MOLTEN CORIUM IN NUCLEAR ACCIDENTS

CROSS-REFERENCE TO RELATED PATENT APPLICATIONS

This patent application claims priority from and the benefit of U.S. Provisional Patent Application Ser. No. 62/703,132, filed Jul. 25, 2018, entitled "INJECTABLE SACRIFICIAL MATERIAL SYSTEM TO CONTAIN EX-VESSEL MOLTEN CORIUM IN NUCLEAR ACCIDENTS," which is hereby incorporated by reference in its entirety.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD

The present disclosure is generally directed to nuclear accident containment, and more particularly to an injectable sacrificial material system and method.

BACKGROUND

The catastrophic nuclear reactor accident at Fukushima created a loss of confidence in nuclear energy and a demand for new engineered safety features that could mitigate or prevent radioactive releases to the environment. Molten corium falling into the reactor cavity after the reactor vessel breaches is a major concern in severe accident management because it could result directly breaching of the containment. Corium, also called fuel containing material (FCM) or lava-like fuel containing material (LFCM) due decay heat, is a lava-like material created in the core of a nuclear reactor during a meltdown accident. It consists of a mixture of nuclear fuel, fission products, control rods, structural materials from the affected parts of the reactor, products of their chemical reaction with air, water and steam, and, in the event that the reactor vessel is breached, molten concrete from the floor of the reactor room. Some new reactor designs employ a core catcher formed of concrete and a ceramic sacrificial material to slow the molten flow.

The primary function of the sacrificial material (SM) is to ensure effective cooling and immobilizing the core melt, eliminate or minimize hydrogen gas release, and maximize radionuclide retention. Existing reactors rely on water to provide cooling. Because existing reactors cannot easily be modified to include these SMs and due to limitations associated with these SMs, a solution is needed that can ensure effective cooling and immobilization of the core melt, eliminate or minimize hydrogen gas release, and maximize radionuclide retention.

SUMMARY OF THE DISCLOSURE

The present disclosure is directed to a system for delivering a carbonate-based material within a nuclear reactor containment. The system includes a nuclear reactor contained within the nuclear containment, a storage tank containing a mass of the carbonate-based material, and a fluid delivery system for transporting the carbonate-based material within the nuclear containment.

The present disclosure is further directed to a method for containing corium in a nuclear reactor accident within a reactor containment by contacting a carbonate-based granular material with molten corium.

BRIEF DESCRIPTION OF THE DRAWINGS

Wherever possible, the same reference numbers will be used throughout the drawings to represent the same parts.

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art.

The present disclosure is directed to systems and methods for injecting a sacrificial material (SM) system to contain and cool molten corium during a nuclear accident. In an embodiment, the nuclear accident may be a lower head failure at a commercial light water nuclear reactor (LWR). The SM is a carbonate-based granular material. The sacrificial materials (SMs) ensure effective cooling and immobilization of the core melt, eliminate or minimize hydrogen gas release, and maximize radionuclide retention, thus preventing or minimizing release from containment. The SM quickly cools the corium mixture while creating an inert gas to form porosity in the solidified corium mixture, such that subsequent water flooding can penetrate the open pore structure within the corium mixture for additional cooling. In addition, the SM may form a barrier to prevent the further movement of corium and limit corium-concrete interactions.

The carbonate-based granular material is an alkaline, an alkali, transition metal carbonate or mixtures thereof. The material may be a mineral or a mixture of these minerals. In an embodiment, the alkaline carbonate material is selected from a group including, but not limited to calcium carbonate ($CaCO_3$), magnesium carbonate ($MgCO_3$), dolomite [$CaMg(CO_3)_2$] and mixtures thereof. In an embodiment, the alkali carbonate may be, but is not limited to sodium carbonate ($Na_2CO_3$), potassium carbonate ($K_2CO_3$) and mixtures thereof. In an embodiment, the transition metal carbonate may be, but is not limited to iron carbonate ($FeCO_3$), manganese carbonate ($MnCO_3$) and mixtures thereof. In an embodiment, the carbonate-based granular material may be a mineral derived from naturally occurring carbonate rocks or minerals including limestone, dolomite, calcite, magnesite and siderite, which are generally bulkily available and cheap. In an embodiment, the carbonate-based, granular material may be prepared from these naturally occurring rocks and minerals, for example, by crushing, grinding and/or palletization. When prepared from mineral deposits, the material may also be referred to as mineral-based. The solid carbonate-based granular material has a particle size of sub-millimeters to centimeters in diameter. The particle size (or grain size) can purposely be engineered to control the rate of carbonate decomposition in the cooling of a corium melt.

Figure 1:
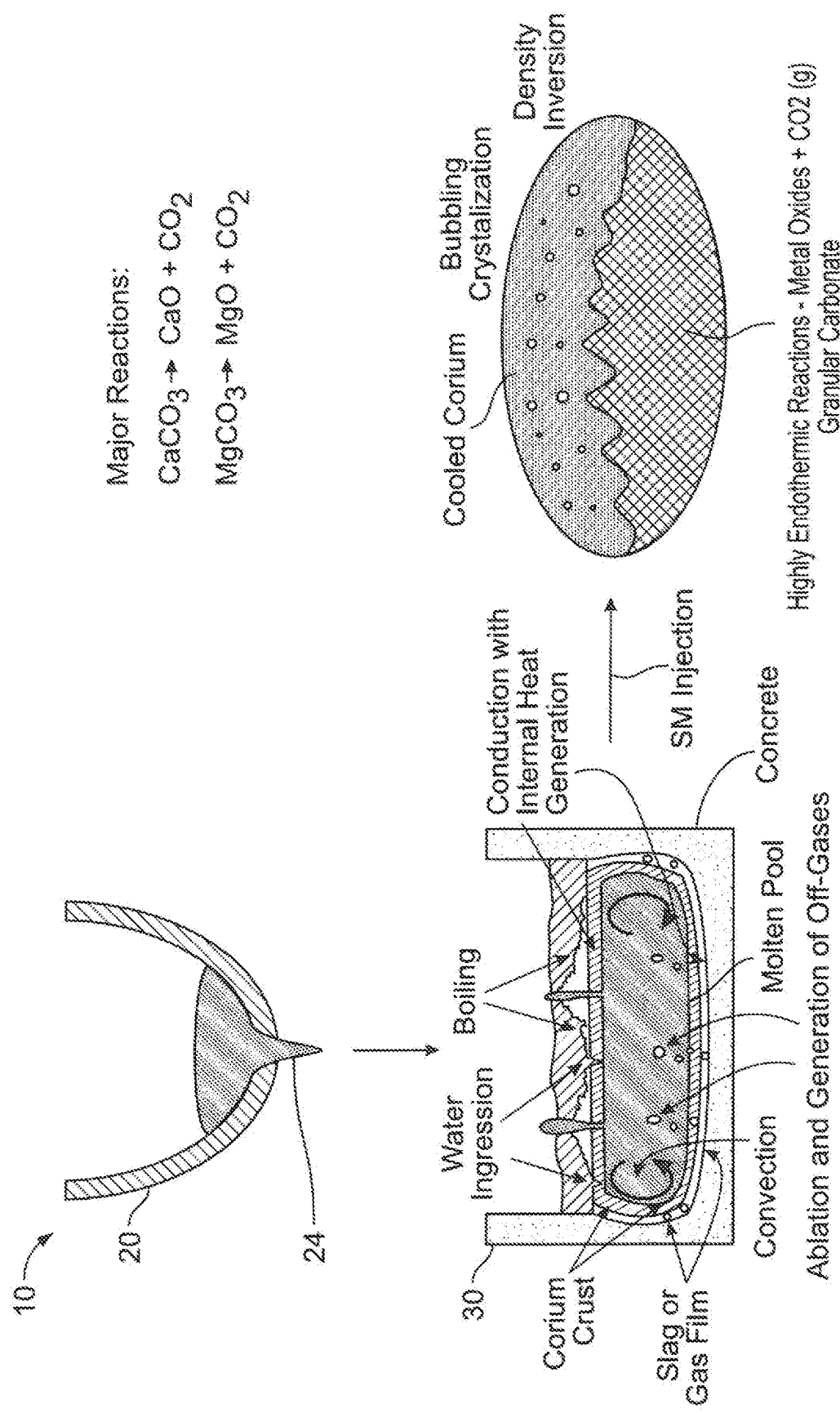
FIG. 1 illustrates an embodiment of an arrangement using the carbonate-based SM during a nuclear accident.

FIG. 1 illustrates an embodiment 10 of an arrangement using the carbonate-based SM during a nuclear accident. As can be seen in FIG. 1, a reactor vessel 20 is shown breached and molten corium 24 is shown escaping therefrom. The escaping corium 24 forms a molten pool and corium crust as shown in the containment vessel 30. Cooling water is in contact with the corium, and slag and/or gas films may be present. Heat is being transported in the molten corium via convection and is also being conducted to the corium crust and slag and gas film.

Carbonate decomposition is highly endothermic ($\Delta H_0 = \sim 170$ KJ/mol for $CaCO_3$). At the anticipated lower head vessel failure, the injection of the carbonate-based SM into the reactor cavity can preferably be carried out prior to the vessel failure. This geometry allows the molten corium to fall onto the SM bed to allow the highly endothermic reactions to take place whereby the carbon minerals decompose endothermically, resulting in rapid cooling and thus solidification of the molten corium. In this embodiment, the carbonate-based SM includes $CaCO_3$ and $FeCO_3$. In other embodiments, other carbonate-based SMs according to this disclosure may be used.

$CO_2$ generated from mineral decomposition displaces any preexisting oxygen from the metal oxidation and suppresses the possibility for hydrogen explosion. $CO_2$ bubbles through the molten corium, creating porosity and large surface areas that could facilitate subsequent dissipation of radionuclide decay heat by water circulation after corium solidification. In addition to $CO_2$ bubbling, the resulting metal oxide will mix with the corium, creating a density inversion that promotes further mixing of the SM with the corium and accelerating the reaction (see FIG. 1).

The carbonate-based SM can include other inorganic compounds which can be stabilized at high temperature and able to sequestrate highly mobile radionuclides, such as Cs-137, Sr-90, and I-129 or minimize hydrogen gas generation. By controlling the composition of the carbonate-based SM, for example, by adding hematite ($Fe_2O_3$) which can convert metallic zirconium to zirconium oxide by reaction during corium cooling and solidification, hydrogen gas generation from metallic zirconium can be minimized or even eliminated in subsequent decay heat dissipation by water circulation. The percentage of $Fe_2O_3$ to be added is determined by the mass fraction of metallic zirconium initially contained in corium melt. Because of its granular form, the carbonate-based SM can be injected into the reactor cavity and the fluidity of the material and the rate of $CO_2$ generated can be controlled as well by the grain size of the material.

Calculations were performed to estimate the quantities of the carbonates required to solidify a molten corium at 1000 K for several U.S. reactor plant designs using the concept of endothermic decomposition of carbonates by removing heat from molten corium (assuming the molten corium temperature at 2450 K). For these calculations, the carbonate was $CaCO_3$. Its decomposition temperature is at 1098 K. Based on a thermogravimetric analysis (TGA), the carbonate starts to decompose before the decomposition temperature is reached.

In this calculation, the material property values at 1000 K are assumed constant. The grain size of carbonate was 5 mm and the carbonate bed had a porosity of 0.37. The granular carbonate was injected into the cavity (or drywell pedestal) at 298 K. No containment leakage was assumed, even though there is a nominal leakage rate during operation in a plant.

Table 1 shows the results of these calculations for the six PWR and BWR designs types for the U.S. As can be seen in Table 1, the amount of carbonate needed for the complete cooling of corium in these reactor containments was on the order of $10^4$ to $10^5$ kgs.

| Containment Type (Reactor Name) | $CaCO_3$ Injected to Cavity (Kg) | $CO_2$ Generated (kg) |
|---|---|---|
| Large Dry (Zion) | 40,000 | 2,219.0 |
| Sub-atmospheric (Surry) | 60,000 | 1,161.0 |
| Ice Condenser (Sequoyah) | 75,000 | 2,796.0 |
| Mark I (Peach Bottom) | 280,000 | 12,440.0 |
| Mark II (LaSalle) | 250,000 | 4,529.0 |
| Mark III (Grand Gulf) | 350,000 | 2,749.0 |

Figure 2:
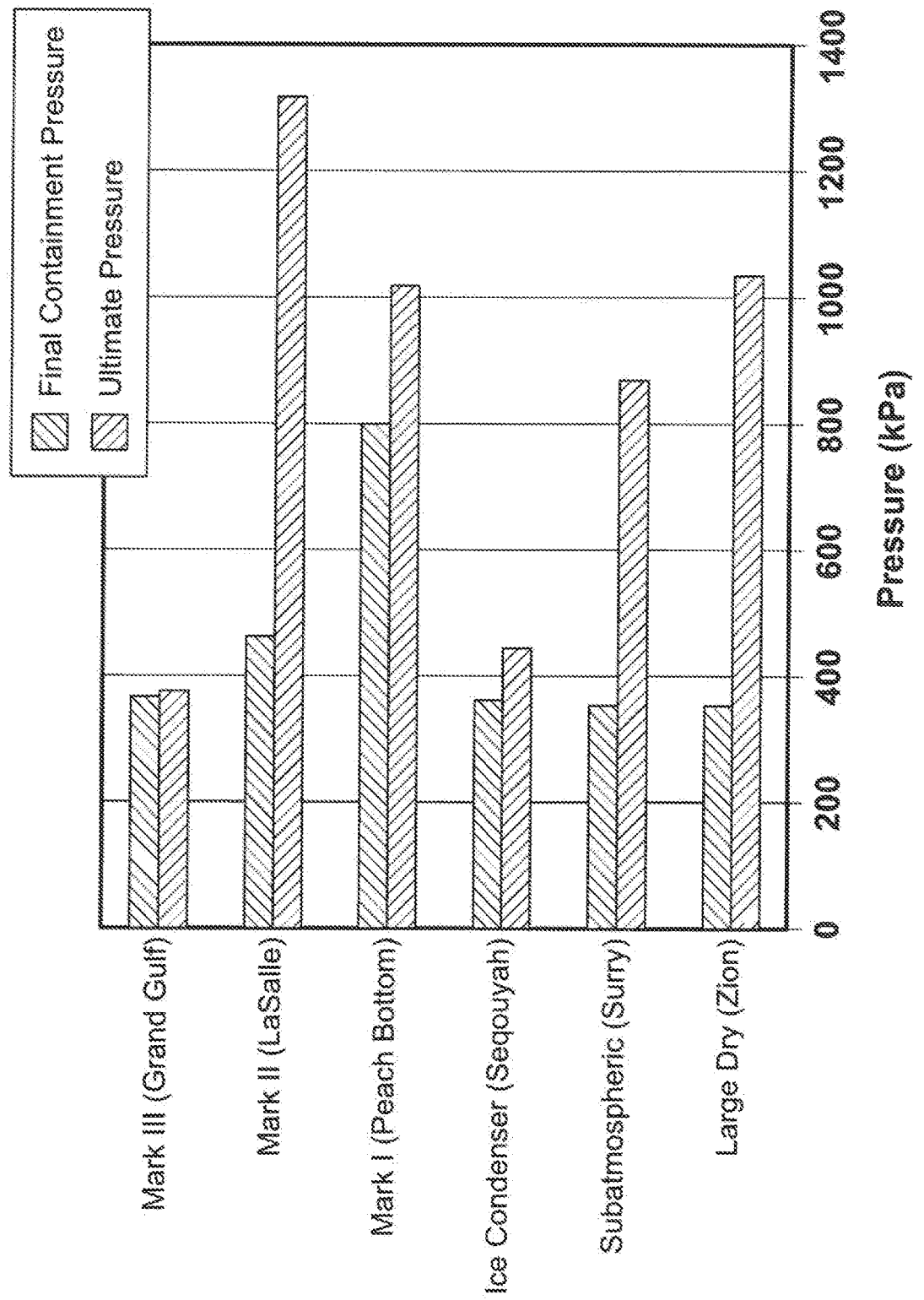
FIG. 2 shows pressures achieved in the reactor containments for various operating reactor designs in U.S.

FIG. 2 shows the calculated pressures achieved in the reactor containments. As can be seen in FIG. 2, only the Mark III plant had a final containment pressure near the ultimate pressure of its containment. Note that this calculation does not consider the heat removal due to containment walls and equipment, and the normal leakage of the containment. The potential gas pressure from the accident is ignored.

The present disclosure is also directed to methods for effectively cooling and immobilizing the core melt, eliminating or minimizing hydrogen gas release, and maximizing radionuclide retention thereby preventing or minimizing release from containment during a nuclear accident. The method includes injecting a sacrificial material (SM) system to contain and cool corium during a nuclear reactor accident. In an embodiment, the nuclear reactor accident may be a lower head failure at a commercial light water nuclear reactor (LWR) which includes the pressurized water reactor (PWR) and the boiling water reactor (BWR). The SM is a carbonate-based granular material.

The carbonate-based material may be injected before, during or after corium has breached the reactor vessel. In an embodiment, the carbonate-based material is injected into the reactor cavity (or pedestal) before the lower head fails. It may be preferred to inject the carbonate-based material prior to lower head failure for several reasons including, but not limited to:

The presence of the carbonates may delay the lower head failure by removing the heat from the lower head during the endothermic reaction of carbonate decomposition.

In case the lower head does fail, the molten corium would fall onto a carbonate bed and react quickly to solidify the corium and generate open porosity structures in solidified corium.

The decomposition of carbonates also allows the atmosphere of the containment to be cooled, which may help condense volatile radionuclide back to the surfaces of solidified corium and the sacrificial material. Importantly, the generation of $CO_2$ from the decomposition would displace the other gases, such as hydrogen and oxygen, thus reducing the potential for hydrogen explosions.

The carbonate-based material delivery system may be an active or a passive injection system. Which of these two delivery systems is selected depends on the final size of the carbonate grains used. The grain size can range between sub-millimeters and centimeters in diameter. For active systems, the smaller size can be delivered using pressurized spray systems, such as those commonly used in automotive industries for painting. Pressure spray systems use a fluid to inject the carbonate-based material into the containment. The fluid may be from liquids, such as water, or pressurized gas, such as $CO_2$. The larger size can be delivered using a particular feed system, such as grain delivery systems used in agricultural applications. In an embodiment of a passive system, gravity can be used to deliver a released carbonate-based material into the reactor cavity.

Figure 3:
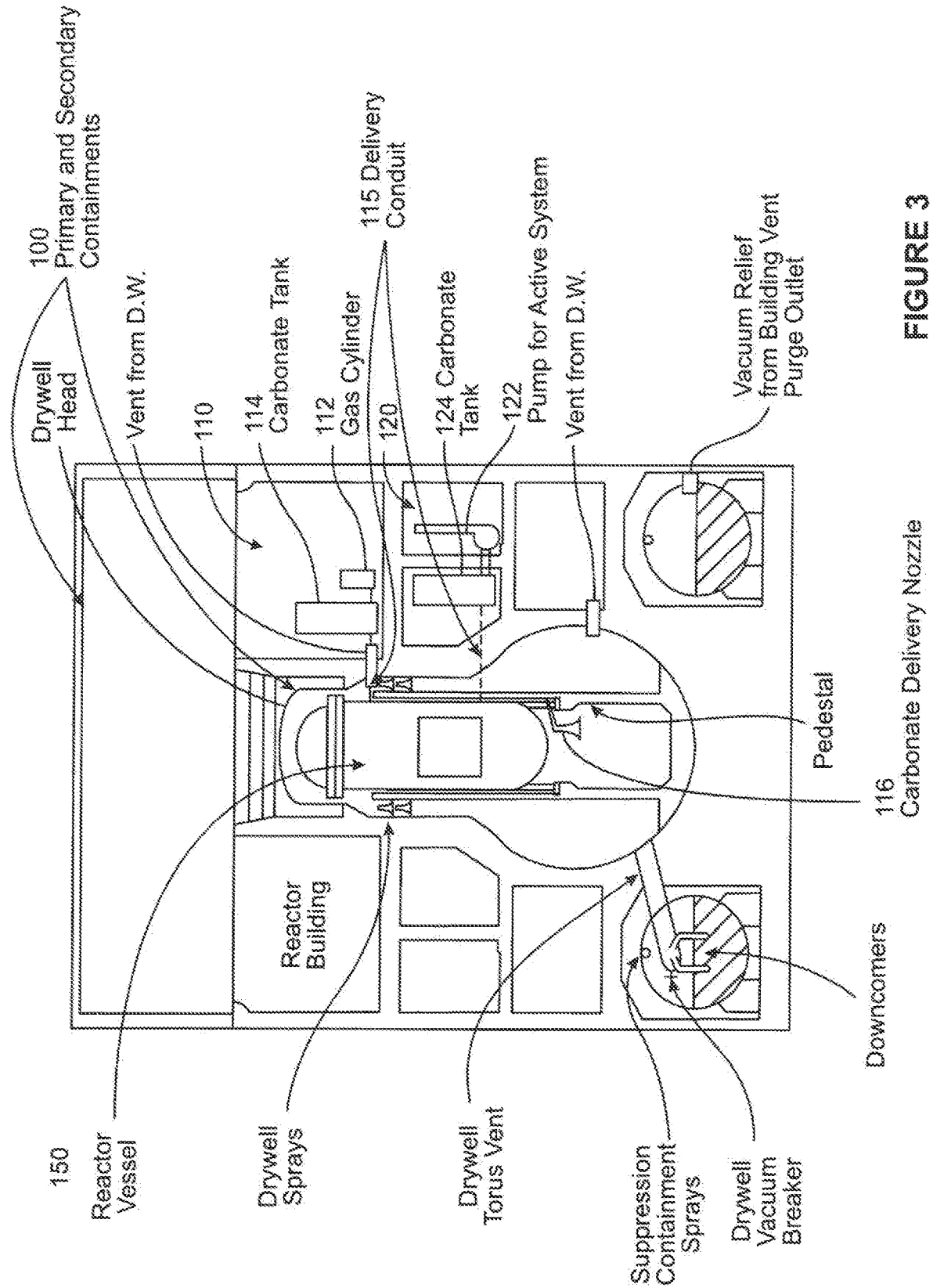
FIG. 3 illustrates two carbonate-based material delivery system embodiments according to the disclosure.

FIG. 3 illustrates two carbonate-based material delivery system embodiments according to the disclosure. As shown in this figure, these systems are for the BWR Mark I containment 100. In other embodiments, the systems may be modified for any other containment but still be within the scope of the invention. As can be seen in FIG. 3, a first active pressurized gas system 110 is incorporated into the containment 100. The pressurized gas system 110 includes a pressurized gas source 112, for example, a pressurized gas tank, for forcing carbonate-based granular material (not shown) within a material storage tank 114 into the reactor vessel 150. The storage tank 114 is connected to a delivery nozzle 116 within the reactor vessel 150 via a delivery conduit 115. The system 110 further includes electrical and flow controls (not shown) for controlling the release of the pressurized gas, material release, and flow amount, these controls being well understood in the material flow arts. In this exemplary embodiment, the pressurized gas source 112 is a pressurized gas tank or cylinder, but in other embodiments, the gas source may be a tank or system located within or partially within the containment 100. Additionally, in this exemplary embodiment, the carbonate-based material is dry, solid granular material. In other embodiments, the carbonate-based material may be in a slurry, such as by using water to facilitate material transport.

The pressurized gas system 110 may be modified by the pressurized gas cylinder 112 to form a passive system, and in such a manner allow the carbonate-based material to flow into the reactor cavity (or pedestal) under gravity.

As can be further seen in FIG. 3, a second active delivery system 120 is shown. The system 120 includes a pump 122 for forcing a carbonate-based material (not shown) contained in a material storage tank 124 into the reactor vessel 150. The tank 124 is connected to the nozzle 116 via a fluid conduit (not shown). As in the earlier embodiment, the system 120 further includes electrical and flow controls (not shown) for controlling the release of the pressurized gas, material release, and flow amount, these controls being well understood in the material flow arts.

The invention being thus described, it will be obvious that the same may be varied in many ways. Such variations are not to be regarded as a departure from the spirit and scope of the invention, and all such modifications as would be obvious to one skilled in the art are intended to be included within the scope of the appended claims. It is intended that the scope of the invention be defined by the claims appended hereto. The entire disclosures of all references, applications, patents and publications cited above are hereby incorporated by reference.

In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A system for delivering a carbonate-based material within a nuclear reactor containment, comprising:
    a light water or boiling water nuclear reactor contained within a primary nuclear containment;
    a storage tank containing a mass of the granular carbonate-based material external to the primary nuclear containment and within a secondary containment surrounding the primary containment;
    an injectable fluid delivery system for injecting the carbonate-based material under pressure through one or more carbonate delivery nozzles within the nuclear containment vessel; and
    wherein the fluid delivery system is a pressurized, active delivery system.

2. The system of claim 1, wherein the pressurized, active delivery system comprises a pump or pressurized gas tank.

3. The system of claim 1, wherein the carbonate-based material is a carbonate-based material selected from a group consisting essentially of alkaline, alkali, transition metal carbonates and mixtures thereof.

4. The system of claim 3, wherein the carbonate-based material is an alkaline carbonate-based material selected from a group consisting essentially of calcium carbonate (CaCO3), magnesium carbonate (MgCO3), dolomite [CaMg (CO3)2] and mixtures thereof.

5. The system of claim 3, wherein the carbonate-based material is an alkali carbonate-based material selected from a group consisting essentially of sodium carbonate (Na2CO3), potassium carbonate (K2CO3) and mixtures thereof.

6. The system of claim 3, wherein the carbonate-based material is a transition metal carbonate-based material selected from a group consisting essentially of iron carbonate (FeCO3), manganese carbonate (MnCO3) and mixtures thereof.

* * * * *